US010479493B2

(12) United States Patent
Sequera et al.

(10) Patent No.: US 10,479,493 B2
(45) Date of Patent: Nov. 19, 2019

(54) DAMPER DEVICE AND AN AIRCRAFT

(71) Applicant: AIRBUS HELICOPTERS, Marignane (FR)

(72) Inventors: Damien Sequera, Nimes (FR); Jean-Pierre Jalaguier, Vitrolles (FR); Wojciech Gregorczyk, Lodz (PL)

(73) Assignee: AIRBUS HELICOPTERS, Marignane (FR)

( * ) Notice: Subject to any disclaimer, the term of this patent is extended or adjusted under 35 U.S.C. 154(b) by 603 days.

(21) Appl. No.: 15/231,430

(22) Filed: Aug. 8, 2016

(65) Prior Publication Data
US 2017/0043868 A1    Feb. 16, 2017

(30) Foreign Application Priority Data

Aug. 14, 2015 (FR) ..................... 15 01736

(51) Int. Cl.
*B64C 27/51*    (2006.01)
*B64C 27/635*    (2006.01)
(Continued)

(52) U.S. Cl.
CPC ............ *B64C 27/635* (2013.01); *B64C 27/51* (2013.01); *B64C 27/64* (2013.01); *B64D 45/00* (2013.01); *F16F 13/06* (2013.01)

(58) Field of Classification Search
CPC ....... B64C 27/51; B64C 27/64; B64C 27/635; B64D 45/00; F16F 9/50
(Continued)

(56) References Cited

U.S. PATENT DOCUMENTS 2,899,023 A * 8/1959 Rumsey .................... F16F 9/52
  188/277
5,004,215 A * 4/1991 Aubry ..................... B64C 27/51
  180/312
(Continued)

FOREIGN PATENT DOCUMENTS

CN    102501970    6/2012
FR    2592696    7/1987
(Continued)

OTHER PUBLICATIONS

French Search Report for French Application No. FR 1501736, Completed by the French Patent Office, dated Jun. 6, 2016, 6 Pages.
(Continued)

*Primary Examiner* — Christopher P Schwartz
(74) *Attorney, Agent, or Firm* — Brooks Kushman P.C.

(57) ABSTRACT

A damper device provided with a first connection member, a second connection member, a resilient member, and a hydraulic system. The hydraulic system includes an outer casing and a rod, the first connection member being fastened in reversible manner to the outer casing, the resilient member being arranged around a projecting portion of the rod, the resilient member comprising at least one resilient means interposed between a first strength member and a second strength member, the first strength member being fastened in reversible manner to the outer casing, the second strength member being constrained to move in translation with the projecting portion, and the connection member being fastened in reversible manner to the projecting portion.

20 Claims, 7 Drawing Sheets

(51) Int. Cl.
*F16F 13/06* (2006.01)
*B64C 27/64* (2006.01)
*B64D 45/00* (2006.01)

(58) Field of Classification Search
USPC .................. 244/17.11; 267/140.11, 140.13; 416/140, 204 R
See application file for complete search history.

(56) References Cited

U.S. PATENT DOCUMENTS

| | | | | |
|---|---|---|---|---|
| 5,662,046 | A * | 9/1997 | Wright | B61F 5/24 105/167 |
| 8,752,784 | B2 * | 6/2014 | Jolly | B64C 27/51 244/17.13 |
| 2003/0146343 | A1 * | 8/2003 | Zoppitelli | B64C 27/35 244/17.11 |
| 2012/0051909 | A1 * | 3/2012 | McGuire | B64C 27/51 416/1 |
| 2012/0141276 | A1 * | 6/2012 | Fuhrer | B64C 27/51 416/140 |
| 2012/0195760 | A1 * | 8/2012 | Lopez | F16F 9/20 416/204 R |
| 2013/0164131 | A1 | 6/2013 | Russell | |

FOREIGN PATENT DOCUMENTS

| | | |
|---|---|---|
| FR | 2950027 | 3/2011 |
| WO | 2010129322 | 11/2010 |
| WO | 2012148389 | 11/2012 |
| WO | 2013152300 | 10/2013 |

OTHER PUBLICATIONS

Notice of Preliminary Rejection for Korean Application No. 10-2016-0101907, dated Aug. 29, 2017, 2 Pages.
Canadian Examiners Report dated May 26, 2017, Application No. CA 2,936,791, 4 Pages.

* cited by examiner

DAMPER DEVICE AND AN AIRCRAFT

CROSS-REFERENCE TO RELATED APPLICATIONS

This application claims priority to French patent application No. of FR 15 01736 filed on Aug. 14, 2015, the disclosure of which is incorporated in its entirety by reference herein.

BACKGROUND OF THE INVENTION (1) Field of the Invention

The present invention relates to a damper device, and to an aircraft including at least one lead/lag damper device of this type.

The invention relates to the general technical field of damping movements in a mechanical system, and more particularly to the field of equipment including damper systems for use in aviation.

The invention is applicable in any damper system, and in particular in lead/lag dampers used on a lift rotor of a rotorcraft, and in particular of a helicopter. The invention is thus situated in the narrow technical field of lead/lag dampers.

(2) Description of Related Art

On a helicopter rotor, a damper device may connect each blade to the hub of the rotor or may connect together two consecutive blades. Such a damper device is known in particular as a "lead/lag" damper.

The combination of the flapping movement of the blades and of the rotary movement of the blades about the axis of rotation of the rotor leads to a Coriolis force appearing, i.e. a periodic force that causes the blades to oscillate in their plane of rotation. Consequently, a damper device connected to a blade of a rotorcraft rotor serves firstly to damp the oscillations of the blade performing lead/lag movement. The stiffness of the damper device thus limits the amplitude of the lead/lag movement of the blade in flight.

Such a damper device can serve secondly to at least limit the risk of the appearance of resonance phenomena known as "ground" resonance and as "air" resonance.

Consequently, a damper device presents stiffness that is designed so that the resonant frequency of the blades of a rotor during lead/lag movement is appropriate to satisfy dimensional requirements for good operation of the rotor, e.g. with respect to the ground resonance phenomenon. Furthermore, a damper device is also designed to damp the lead/lag movements of the blades in order to limit any risk of entering into ground resonance when the resonant frequency about stationary axes of the rotor blade during lead/lag movement is equal to an excitation frequency of the fuselage of the aircraft standing on its landing gear.

Likewise, the damping provided by a damper device seeks to combat the phenomenon of air resonance.

In order to generate an appropriate damping relationships, it is known to use particular damper devices. In general, these damper devices are based on a characteristic relationship for a force as a function of the dynamic movement of the damper device. The relationship presents three distinct damping ranges depending on the dynamic movement to which the lead/lag damper is subjected.

Such a relationship is referred to as a "triple slope" type relationship. Specifically, the relationship presents a first segment corresponding to the operation required for combating the ground resonance phenomenon, a second segment corresponding to the operation required in flight, and a third segment for combating the air resonance phenomenon.

In this context, a known damper device presents resilient members only, such as springs.

Another known damper device presents a hydraulic system only.

Another damper device is a "mixed" damper. A mixed damper device has both a hydraulic system and a resilient member.

Document FR 2 950 027 describes a damper device having a plurality of blocks of elastomer.

Document CN 102 501 970 also describes a system having a plurality of blocks of elastomer.

A known mixed damper device is provided with a hydraulic system and with a resilient member arranged in parallel between two connection members.

A first connection member is secured to a strength member referred to as an "intermediate" strength member. The intermediate strength member includes a ring carrying a piston.

A second connection member is secured to a strength member referred to as the "central" strength member and to a strength member referred to as the "external" strength member, which strength members are arranged radially on either side of the intermediate strength member. An annular block of elastomer of the resilient member is secured to the intermediate strength member and to the external strength member. In contrast, hydraulic chambers of a hydraulic system are defined by the intermediate strength member and the central strength member.

A movement of the first connection member relative to the second connection member then stresses both the resilient member and the hydraulic system.

Nevertheless, it is found that such a mixed damper device can be difficult to maintain. For example, it may be necessary to disassemble the damper device completely in order to replace the resilient member, because of the physical link that exists between the resilient member and the hydraulic system. A failure of the resilient member thus leads to onerous maintenance actions. Unfortunately, resilient members, in particular members made of elastomer, can present a lifetime that is limited.

Document FR 2 592 696 describes a damper device of that type.

Document US 2013/0164131 also describes a damper device of that type. A first elastomer ring extends radially between an intermediate strength member and a central strength member, and a second elastomer ring extends radially between an intermediate strength member and an external strength member.

Document EP 2 678 222 describes a damper device having a first connection member secured to a hydraulic system. A second connection member is secured to a strength member, a resilient member being interposed between the strength member and the hydraulic system. The connection member and the hydraulic system operate in series as a result of the first connection member moving relative to the second connection member, i.e. one after the other.

Documents WO 2012/148389, WO 2013/152300, US 2012/0141276, and WO 2010/129322 are also known.

Document US 2012/0141276 describes a damper device having a resilient member defining a hydraulic chamber in part.

BRIEF SUMMARY OF THE INVENTION

An object of the present invention is thus to propose a damper device having a resilient member and a hydraulic system that operate in parallel, while seeking to facilitate maintenance operations.

According to the invention, a damper device is provided with a first connection member and with a second connection member that are suitable for connecting the damper device respectively to a first mechanical member and to a second mechanical member, the damper device including a resilient member and a hydraulic system that are interposed between the first connection member and the second connection member.

The hydraulic system includes an outer casing housing a hydraulic fluid, the hydraulic system including a rod that is movable in translation relative to the sealed outer casing, said hydraulic fluid of the damper device being contained solely in said hydraulic system except in the event of a leak from the hydraulic system, the rod extending longitudinally from a first end to a second end along a longitudinal axis, the rod having a projecting portion that projects longitudinally from the outer casing, the first connection member being fastened reversibly to the outer casing in order to be constrained to move in translation with the outer casing. The resilient member is arranged around the projecting portion of the rod, the resilient member comprising at least one resilient means interposed between a first strength member and a second strength member, the resilient member and the hydraulic system comprising two distinct modules, the first strength member being fastened in reversible manner to the outer casing in order to be constrained to move in translation with the outer casing, the second strength member is constrained to move in translation with the projecting portion, the second resilient member being fastened in reversible manner to the projecting portion.

For example, at least one connection member includes a clevis or a ball joint. The damper device may be a lead/lag damper interposed between two blades of a rotor, or indeed between a blade and a hub of a rotor.

Furthermore, the damper device presents an architecture that is modular. The first connection member, the hydraulic system, the resilient member, and the second connection member may be constituted by modules that are fabricated separately. Under such circumstances, the first connection member is reversibly fastened to the outer casing of the hydraulic system by conventional means, such as screw fastener means. The outer casing is also fastened in reversible manner to the resilient member of the hydraulic system by conventional means, such as screw fastener means. Finally, the second connection member is fastened to the rod of the hydraulic system.

The damper device then presents a hydraulic system and a resilient member that operate in parallel. A movement of the first connection member causes both the outer casing and the first strength member to move relative to the rod of the hydraulic system. This movement of the outer casing and of the first strength member stresses both the hydraulic fluid and the resilient means.

Conversely, a movement of the second connection member causes the rod of the hydraulic system to move relative to the outer casing and to the first strength member.

In addition, the modular architecture of the damper device enables the module to be disassembled without opening the hydraulic system, thereby enabling maintenance actions to be optimized. In particular, the resilient member may be removed without opening the hydraulic system. Since the resilient means are not directly connected to the hydraulic system, this architecture makes it easy to access the resilient member.

It should be observed that this modular architecture is innovative specifically in that the module including the hydraulic system and the module including the resilient member form two distinct assemblies, unlike the teaching of the prior art and contrary to prejudices concerning the risk of these two assemblies breaking apart under high levels of stress at high frequency.

The damper device may also include one or more of the following characteristics.

Under such circumstances, the rod may include a projecting portion projecting longitudinally from a first side of the outer casing, and said damper device including a closed first space through which the projecting portion passes and arranged between the outer casing and the resilient member, said first space being hydraulically isolated from said hydraulic system in the absence of leakage from the hydraulic system.

Optionally, the rod may have a projecting portion that projects longitudinally from a first side of the outer casing and a projecting portion that projects longitudinally from a second side of the outer casing, said damper device having a closed first space through which the projecting portion passes that is arranged between the outer casing and the resilient member, the projecting portion moving in a closed second space arranged between the outer casing and an internal wall of the first connection member.

The movement of the rod relative to the outer casing can lead to hydraulic fluid leaking out from the outer casing, even in the presence of a dynamic seal. Nevertheless, the hydraulic fluid then escapes to a space that is closed, either by the resilient member or else by the first connection member. The leak is then not visible from the outside. There is then no need to use drainage means.

Optionally, said damper device may nevertheless include a monitoring system for evaluating the quantity of hydraulic fluid present in the outer casing.

The monitoring system may be in the form of electronic means measuring a pressure and connected to means for issuing an alert or for storing data. The measured pressure information serves to determine the presence of a hydraulic fluid leak, if any. In particular, the pressure that exists in a compensation chamber can be evaluated.

The monitoring system may be in the form of visual means such as a mechanical gauge or a particular indication. The mechanical gauge may serve to visualize a movement of a movable piston defining a compensation chamber.

Furthermore, the first strength member may carry fins extending radially.

The modular design of the damper device enables fins to be arranged on the first strength member. These fins serve to optimize a heat exchange area between the resilient member and outside air in order to optimize cooling of the resilient member.

In this respect, fins may also be fitted to the damper system module.

In addition, the hydraulic system may include a piston longitudinally defining two hydraulic chambers within an internal space arranged in the outer casing.

The piston is advantageously carried by the rod.

A relative movement of the rod and the outer casing leads to a movement of the hydraulic fluid giving rise to damping by throttling through orifices.

In particular, at least one calibrated orifice may be provided through the piston in order to throttle the hydraulic fluid going from one hydraulic chamber to the other hydraulic chamber when the piston moves.

Optionally, the hydraulic chambers are of identical section, each section representing a cross-section of a hydraulic chamber in a plane perpendicular to the longitudinal axis.

This characteristic makes it possible to generate opposite variations of volume in the hydraulic chambers during a movement of the piston. When a certain quantity of hydraulic fluid is filled into one chamber, the same quantity is emptied from the other chamber.

Furthermore, the hydraulic chambers may be in hydraulic communication with two limiter valves, one limiter valve being referred to as the "compression" limiter valve and one limiter valve being referred to as the "traction" limiter valve, the limiter valves throttling said hydraulic fluid passing from one hydraulic chamber to the other hydraulic chamber from a determined amplitude of movement of the piston.

The use of limiter valves makes it possible to obtain a damper device that presents a plurality of slopes.

During a first stage of operation on the ground, the hydraulic fluid passes through the calibrated orifices in the piston. The damper device then operates on a first segment of a damping relationship that presents a first slope. This mode of operation is useful for combating the ground resonance phenomenon.

In a second stage of operation, in flight, a limiter valve opens. The hydraulic fluid is then throttled through the limiter valve and through the calibrated orifices in the piston. Consequently, the damper device operates on a second segment presenting a second slope of the damping relationship.

When the limiter valve opens and reaches an abutment, the damper device then operates on a third segment presenting a third slope of the damping relationship. This mode of operation is useful for combating the phenomenon of air resonance.

Furthermore, the hydraulic system may have a compensation chamber associated with said hydraulic chambers, the compensation chamber being defined by a plug that is movable in translation and that co-operates with a resilient system.

Such a plug is usually referred to as a "compensation piston". Nevertheless, the term "plug" is used below to avoid confusion with the piston between the hydraulic chambers.

The compensation chamber communicates hydraulically with the hydraulic chambers in order to compensate variations in hydraulic fluid volume as a function of temperature. As a function of these volume variations, the plug moves in order to adapt the volume of the compensation chamber.

In a first variant, the compensation chamber and said plug are housed within the rod, each hydraulic chamber being in fluid flow communication with the compensation volume via a respective through orifice arranged in said rod.

In a second variant, the compensation chamber and the plug are housed in a portion of the outer casing arranged in an internal cavity of the first connection member.

The compensation chamber is in fluid flow communication with each hydraulic chamber directly and/or via the rod.

Furthermore, in a first alternative, the resilient means comprise at least one spring.

In a second alternative, the resilient means comprise at least one ring provided with resilient material selected from the group comprising elastomers.

Each alternative may be combined with the first or the second of the above-described variants.

In addition, the second strength member may include a radial projection that is held longitudinally between a longitudinal abutment of the rod and a longitudinal end of said second connection member.

Consequently, the second strength member is constrained to move in translation with the rod of the hydraulic system and with the second connection member.

Optionally, a member providing freedom to move in translation and in turning is arranged between the radial projection of the second strength member and the rod specifically to enable movement in axial translation, and optionally a very moderate amount of turning of the rod relative to the resilient member about said longitudinal axis.

By way of example, this member may comprise a smooth bearing type member, e.g. constituted by rings providing axial guidance for the rod.

Furthermore, in a first version of the invention, the second connection member may include a nut screwed onto the rod.

In a second version, the second connection member includes a male/female thread that is screwed respectively to engage a female/male thread of said projecting portion, said rod having a turn-preventing orifice suitable for co-operating with a tool for preventing said rod from turning about said longitudinal axis.

Each version may be combined with the first variant or with the second variant, and the first or the second alternatives, as described above.

In addition to a damper device, the invention provides an aircraft including such a damper device.

BRIEF DESCRIPTION OF THE SEVERAL VIEWS OF THE DRAWINGS

The invention and its advantages appear in greater detail in the context of the following description of embodiments given by way of illustration and with reference to the accompanying figures, in which.

Elements present in more than one of the figures are given the same references in each of them.

DETAILED DESCRIPTION OF THE INVENTION

Three mutually orthogonal directions X, Y, and Z are shown in some of the figures.

The first direction X is said to be longitudinal. The term "longitudinal" relates to a direction parallel to this first direction.

The second direction Y is said to be transverse. Finally, a third direction Z is said to be in elevation. The term "radially" refers to a direction present in a plane perpendicular to the second direction and to the third direction.

Figure 1:
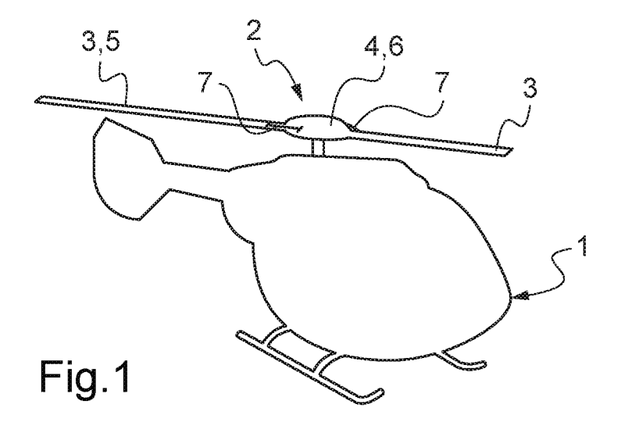
FIG. 1 is a view showing an aircraft of the invention.

FIG. 1 shows an aircraft 1 of the invention. This aircraft is provided with at least one damper device 7. Each damper device 7 is interposed between a first mechanical member 5 and a second mechanical member 6.

In particular, the aircraft 1 may include a rotor 2 having a plurality of blades 3. Each blade 3 may be carried by a hub 4.

Under such circumstances, a damper device 7 may be connected to a first mechanical member 5 in the form of a blade 3. Furthermore, the damper device may be connected to a second mechanical member 6 in the form of the hub 4 as shown in FIG. 1, or indeed to a second mechanical member 6 in the form of an adjacent blade.

FIGS. 2 to 7 show various embodiments of a damper device 7.

Figure 2:
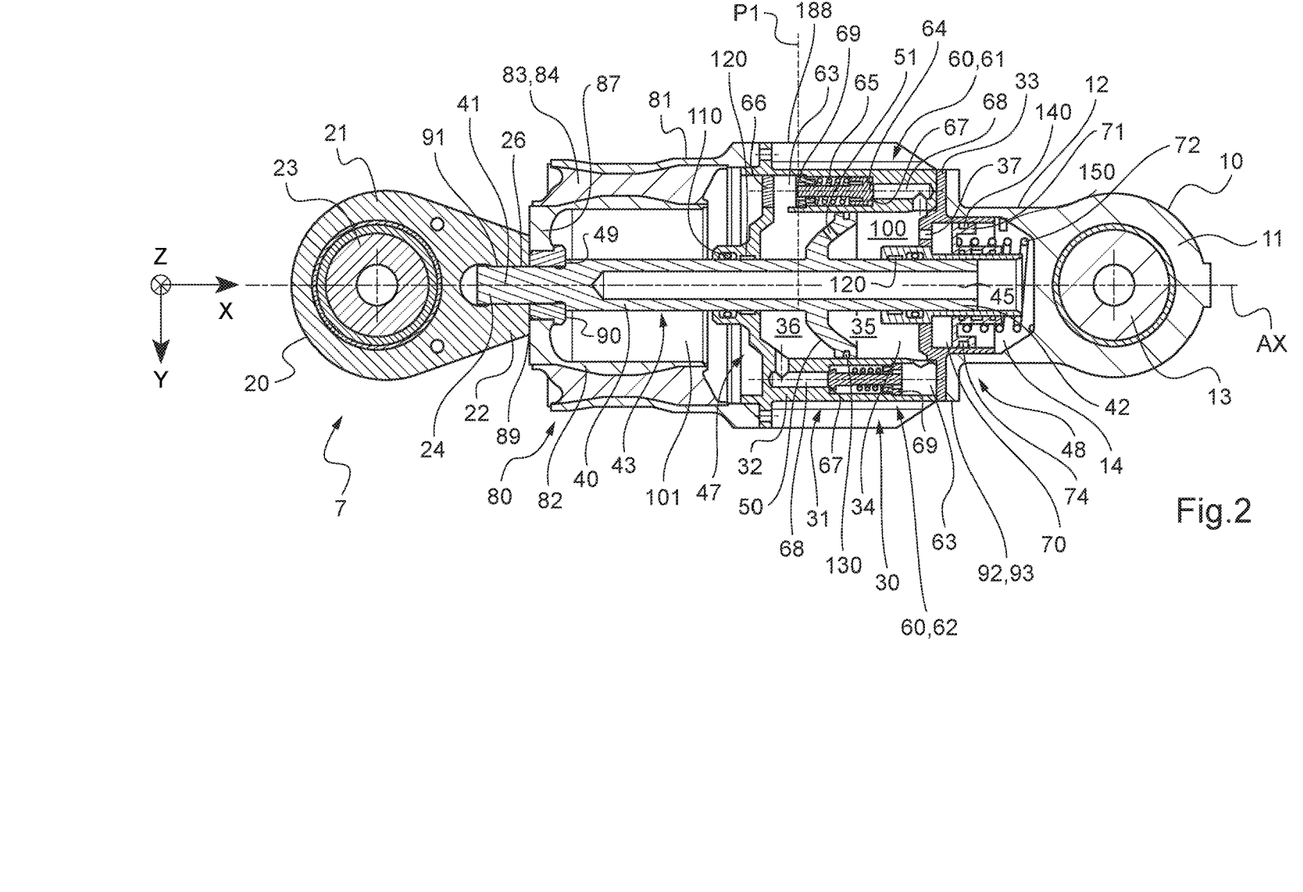
FIG. 2 is a view showing a damper device provided with a connection member screwed to a thread of a rod, a compensation chamber arranged within a cavity of the first connection member, and resilient means comprising a block of elastomer.

Independently of the embodiment, and with reference to FIG. 2, the damper device 7 comprises four modules that may be fabricated separately.

A first module comprises a first connection member 10 suitable for being connected to a mechanical member. This first connection member 10 is provided with a head referred to as the "first" head 11 that is extended by a root referred to as a "first" root 12. The first head 11 carries connection means 13 for connecting to a mechanical member, such as a ball joint, for example. In addition, the first root 12 may be hollow in shape so as to define an internal cavity 14. Furthermore, the first root 12 may extend longitudinally from the first head 11 towards an end 92 suitable for being connected in reversible manner to a second module. For example, the end 92 may be provided with a collar 93 suitable for being screwed to the second module.

The second module includes a hydraulic system 30. The hydraulic system 30 includes a leak-proof shell referred to as an "outer" casing 31. Within it, the outer casing 31 defines volumes that are filled with a hydraulic fluid 100.

The outer casing 31 is reversibly fastened to the first connection member 10. For example, the collar 93 is screwed to a projection of the outer casing.

Furthermore, the outer casing extends longitudinally from a first side 47 to a second side 48 that faces the first connection member 10.

The outer casing may then include a container 32 that is closed by at least one cover 33 and a shutter 66. By way of example, the first connection member is then screwed onto a projection of the cover.

Furthermore, the hydraulic system is provided with a hollow rod 40. The rod 40 extends longitudinally from a first end 41 to a second end 42 along the longitudinal axis AX.

The rod 40 penetrates into the outer casing and it is movable in translation relative to the outer casing.

Under such circumstances, the first end 41 forms part of a projecting portion 43 of the rod 40 that projects longitudinally out from the outer casing from its first side 47.

In the embodiments of FIGS. 2-4, and 6, the second end is received inside the outer casing. In contrast, and with reference to FIG. 5, the second end may project from the second side 48 of the outer casing 31, extending into the internal cavity 14 of the first connection member.

Dynamic seals 110 may be arranged between the outer casing 31 and the rod 40 in order to avoid hydraulic fluid leaking out from the outer casing.

Likewise, and with reference to FIG. 2, guide means 120 of the smooth bearing type may be arranged between the outer casing 31 and the rod 40 to guide the rod and to take up radial forces, i.e. forces in the transverse direction Y.

Furthermore, the hydraulic system 30 includes a piston 50 arranged in an internal space 34 of the outer casing 31. In particular, the piston may be carried by the rod 40.

This internal space may be defined jointly by the container 32, a cover 33, and the rod 40. Under such circumstances, the dynamic seal 130 may be arranged between the piston and the walls of the container defining the internal space.

The piston 50 then defines longitudinally two hydraulic chambers 35 and 36 within the internal space 34. One hydraulic chamber is referred to as the "first" hydraulic chamber 35, the volume of this first hydraulic chamber being reduced when the damper device is compressed. The other hydraulic chamber is said to be a "second" hydraulic chamber 36, and the volume of this second hydraulic chamber is reduced when the damper device is stretched.

In addition, at least one calibrated orifice 51 is provided through the piston 50 to put the first and second hydraulic chambers 35 and 36 into fluid flow communication.

In order to mitigate any risks of cavitation, the first hydraulic chamber and the second hydraulic chamber may be hydraulically connected to the compensation chamber 70 by means of a check valve (not shown) or by equivalent means. Likewise, an anti-cavitation system may be arranged in the system, e.g. within the rod 40 shown in FIG. 7.

Optionally, and with reference to FIG. 2, the rod is a through rod that passes right through the first hydraulic chamber 35 and the second hydraulic chamber 36.

Under such circumstances, the hydraulic chambers 35 and 36 may be identical in section, each section representing a cross-section of a hydraulic chamber 35, 36 in a plane P1 perpendicular to the longitudinal axis AX.

Furthermore, the hydraulic system 30 has two limiter valves 60 arranged within the outer casing. One limiter valve 60 is referred to as the "compression" limiter valve 61, and another limiter valve is referred to as the "traction" limiter valve 62.

Each limiter valve 60 is housed in a chamber of the outer casing referred to as the "limiter" chamber 63 for convenience. One limiter chamber 63 is defined by the container 32 and the cover 33, the other limiter chamber 63 being defined by the container 32 and the shutter 66.

Each limiter chamber 63 also communicates hydraulically with the first hydraulic chamber 35 and with the second hydraulic chamber 36.

In addition, each limiter valve 60 comprises piston type shutter means 64 co-operating with a spring 65. The spring 65 exerts a force on the shutter means 64 in order to close the limiter valve 60. The spring tends to press the shutter means 64 against a seat 67 of the outer casing in order to shut off a constriction 68 of the limiter chamber 63.

In addition, when the limiter valve 60 opens, the stroke of the shutter means may be limited by a limiter abutment 69. The limiter abutment 69 includes a passage presenting a passage area that is different from the passage area of the constriction 68.

Furthermore, the hydraulic system 30 may include a compensation chamber 70.

The compensation chamber is defined in particular by a plug 71 that is movable in translation and that co-operates with a resilient system 72. The resilient system may be in the form of a spring. Furthermore, the plug may be in the form of a compensation piston.

Figure 5:
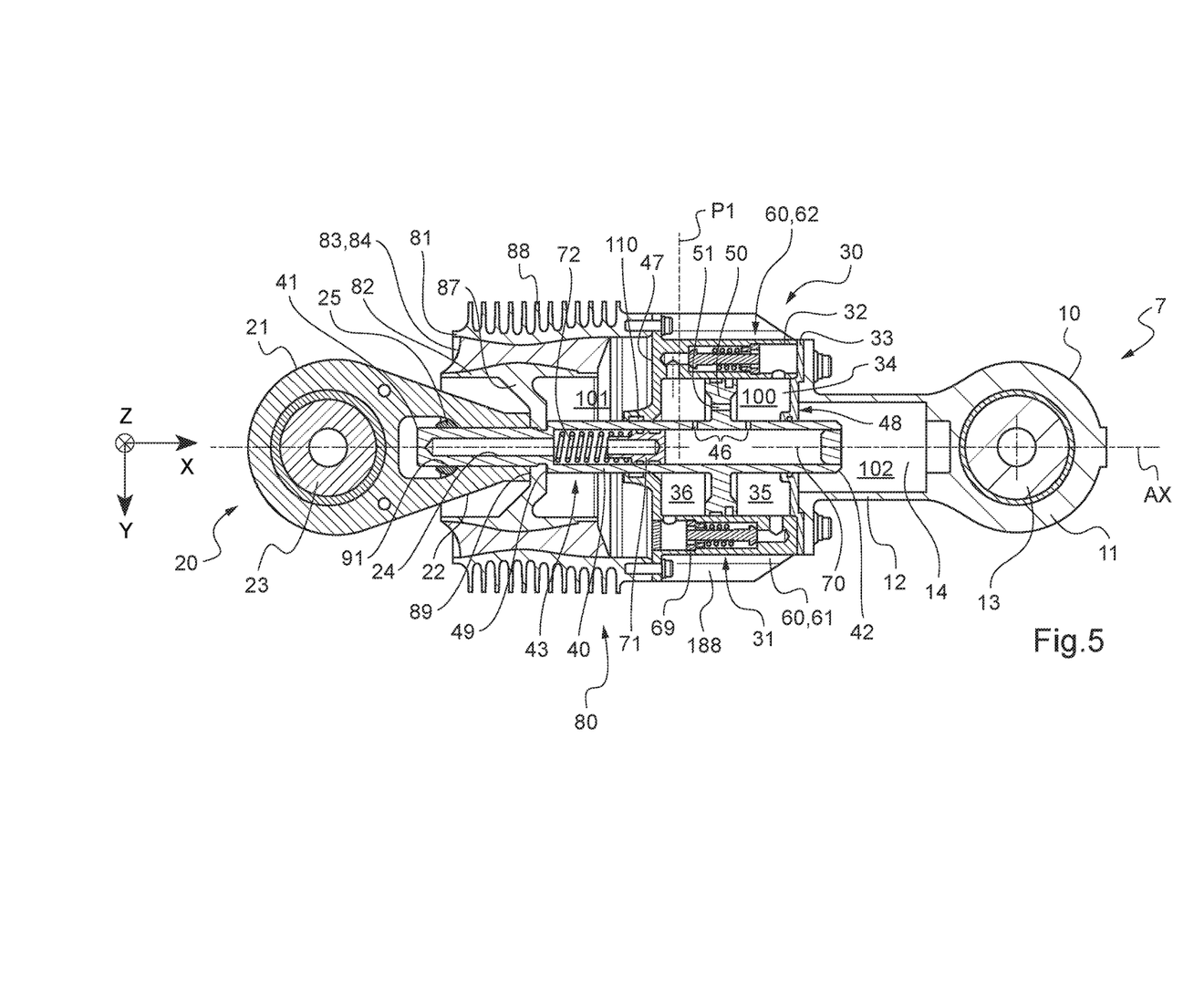
FIG. 5 is a view showing a damper device provided with a connection member provided with a nut, a compensation chamber arranged within a rod, and resilient means comprising a block of elastomer.

In the embodiment of FIG. 5, the compensation chamber 70 and the plug 71 are housed inside the rod 40. The first hydraulic chamber 35 and the second hydraulic chamber 36 are then in fluid flow communication with the compensation chamber 70 provided in the rod 40 via respective through orifices 46.

With reference to FIG. 2, the compensation chamber 70 and the plug 71 may alternatively be housed in a portion 74 of the outer casing 31 that is arranged in the internal cavity 14 of the first connection member 10.

Figure 3:
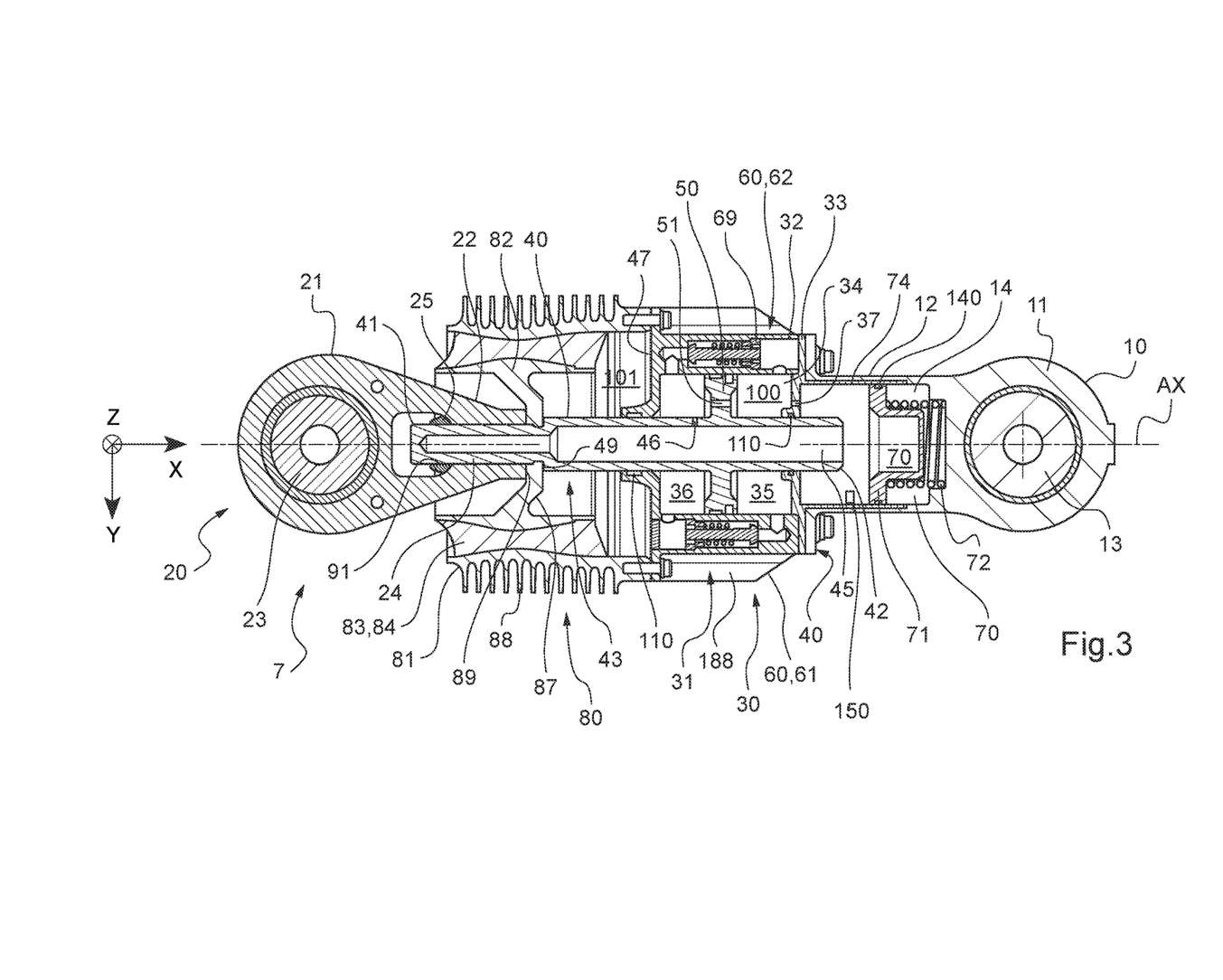
FIGS. 3 and 4 are two views showing a damper device provided with a connection member provided with a nut, a compensation chamber arranged within a cavity of the first connection member, and resilient means comprising a block of elastomer.
Figure 6:
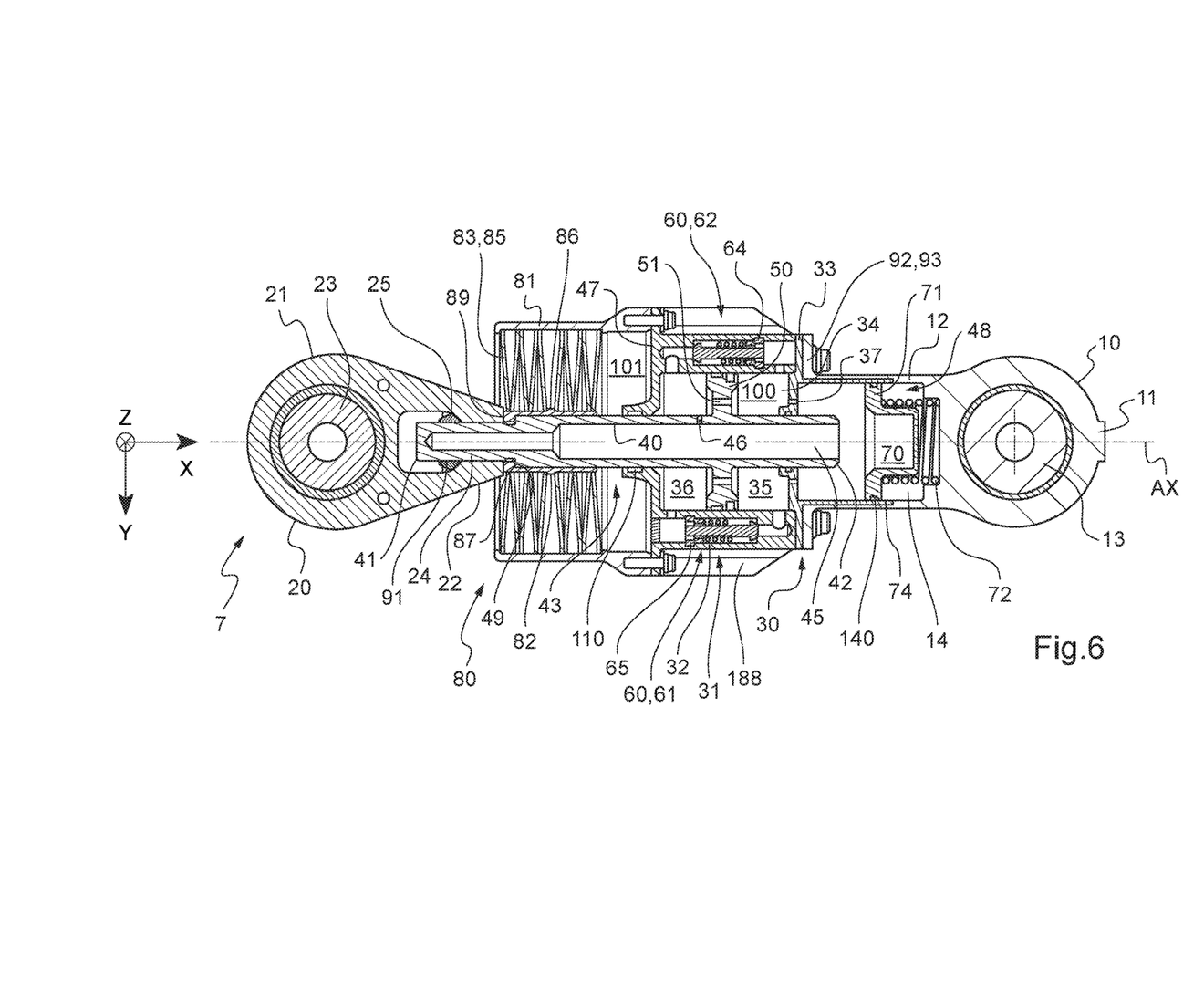
FIG. 6 is a view showing a damper device provided with a connection member provided with a nut, a compensation chamber arranged within a cavity of the first connection member, and resilient means comprising a spring.

In FIGS. 2, 3, and 6, this portion 74 presents a cylinder secured to the cover 33. The plug 71 then slides along the portion 74, a dynamic seal 140 being interposed between the plug 71 and this portion 74.

Under such circumstances, the resilient system extends outside the compensation chamber between the plug 71 and the first connection member 10. The compensation chamber may optionally be arranged between the plug 71 and the cover 33. The compensation chamber 70 communicates with the internal space 34 via an orifice 37.

Figure 4:
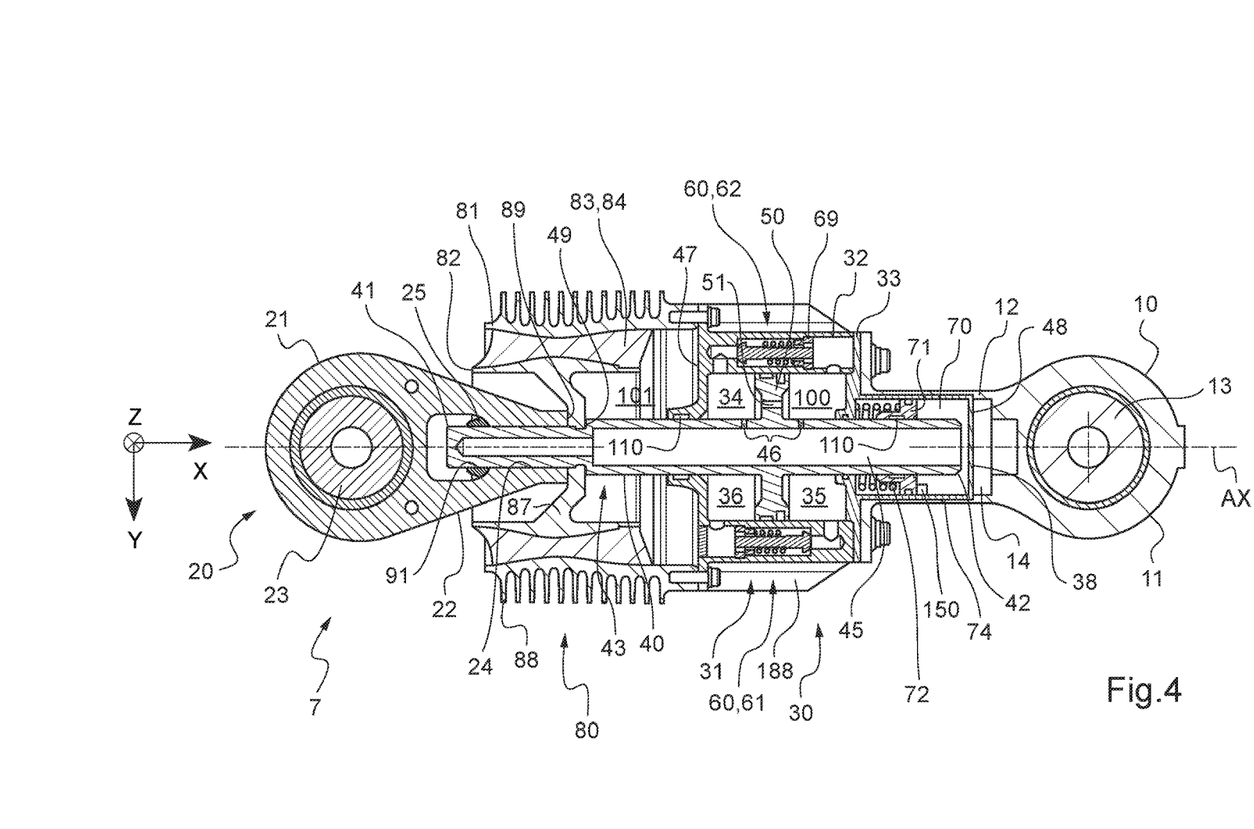

In FIG. 4, this portion 74 is in the form of a U-shaped retaining part 38 fastened to the cover 33. The plug 71 then slides along the retaining part 38, a dynamic seal (not shown) being interposed between the plug 71 and the retaining part 38.

Under such circumstances, the resilient system extends outside the compensation chamber between the plug 71 and the cover 33.

Furthermore, and independently of the embodiment, the damper device 7 may include a monitoring system 150 for evaluating the quantity of hydraulic fluid 100 present in the outer casing 31.

The monitoring system may comprise electronic means or may be in the form of a mechanical gauge. For example, such a gauge may comprise a finger co-operating with the plug 71 in order to provide a visual indication representative of the quantity of hydraulic fluid contained in said damper device. Such visual means are not exclusive. By way of example, they may correspond to providing a viewing window arranged in the first module relative to the first connection member 10 in order to observe colored marks made on the plug 71. Thus, in the event of a hydraulic leak, a green mark is replaced by a red mark as a result of the plug 71 moving towards the hydraulic system 30 under drive from the spring 72.

Furthermore, a third module includes a resilient member 80 that surrounds the rod 40, and in particular its projecting portion 43.

The resilient member 80 is provided with resilient means 80 interposed radially between a first strength member 81 and a second strength member 82.

The first strength member is then fastened reversibly to the outer casing 31 of the hydraulic system 30. For example, the first strength member may be screwed to the container 32.

The first and second strength members 81 and 82 may be bodies of revolution about the longitudinal axis AX. For example, the first strength member 81 may comprise a cylinder surrounding a cylinder of the second strength member 82, the resilient means 83 then being fastened to each of the cylinders.

In the alternative of FIGS. 2 to 5, the resilient member may comprise at least one ring 84. The ring includes a block of resilient material, such as elastomer. Optionally, the resilient material may comprise a plurality of rings 84 arranged around one another or one after another along the longitudinal axis AX.

As shown in FIG. 6, the resilient means may alternatively comprise at least one spring 85. For example, the resilient means may comprise two springs 85 arranged longitudinally on either side of a shoulder 86 of the second strength member.

Furthermore, and with reference to FIGS. 3 to 5, the first strength member may carry fins 88. Each fin 88 extends radially from the first strength member away from the resilient means.

Figure 7:
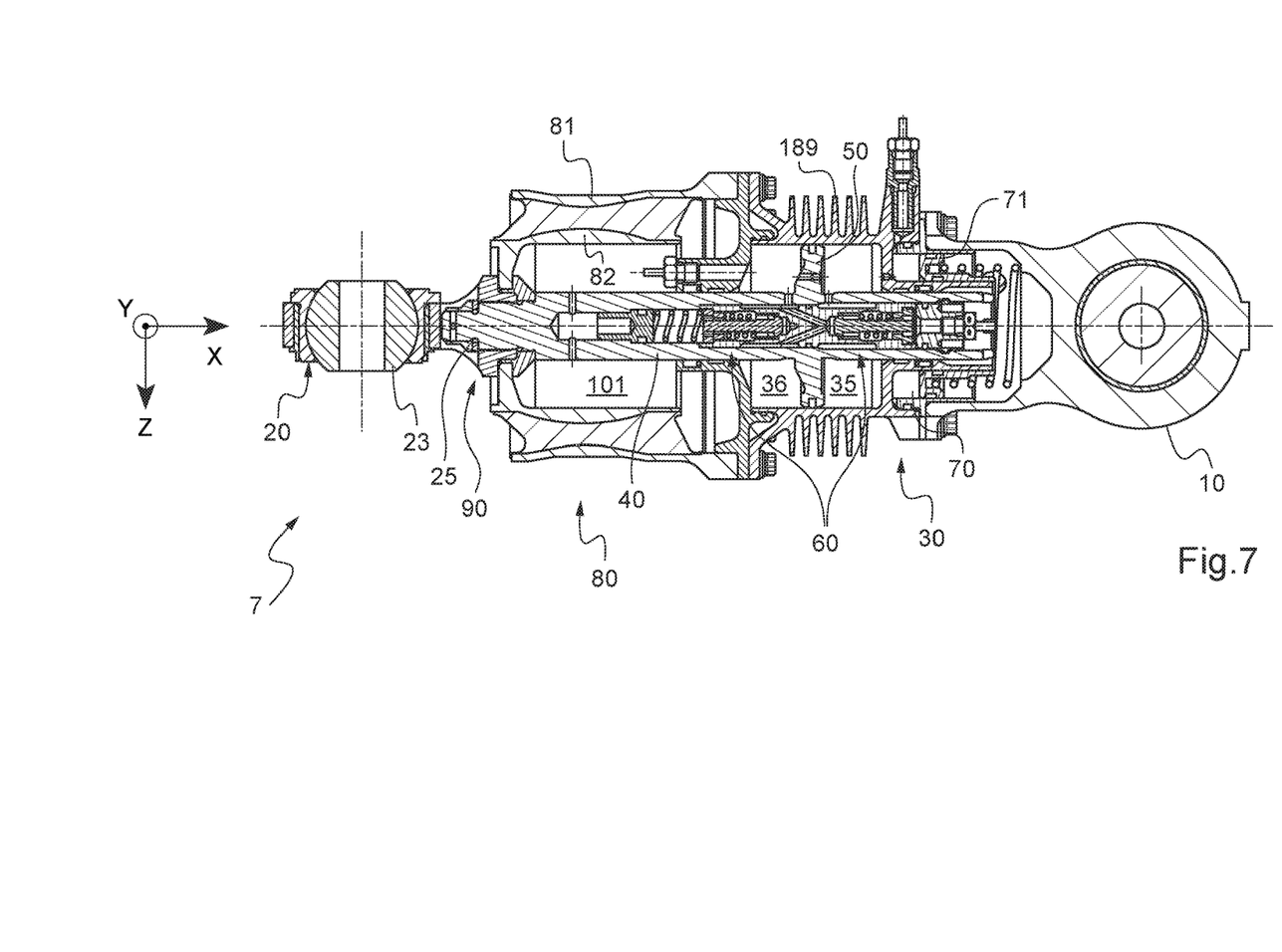
FIG. 7 is a view showing a damper device provided with a connection member provided with a nut, a compensation chamber arranged within a cavity of the first connection member, resilient means comprising a block of elastomer, and a hydraulic system provided with fins and with limiter valves housed in the rod of the system.

On this topic, the second module of the hydraulic system 30 may also likewise include cooling fins that are longitudinal fins 188 in FIGS. 2 to 6, or radial fins 189 in FIG. 7.

In addition, and with reference to FIGS. 3 to 5, the second strength member 82 may have a radial projection 87 that extends towards the longitudinal axis AX to co-operate with a fourth module and with the rod 40. The radial projection 87 may be in the form of a ring. Under such circumstances, the radial projection 87 is held longitudinally between a longitudinal abutment 49 of the rod 40 and a longitudinal end 89 of said fourth module.

Optionally, and with reference to FIG. 2, a shrunk-on ring 90 is arranged between the radial projection 87 and the rod 40.

In addition, a connection member (not shown) of the smooth bearing type may be arranged between the radial projection 87 and the rod 40.

In addition, the fourth module is in the form of a second connection member 20 suitable for being connected to a mechanical member. This second connection member 20 is provided with a head referred to as the "second" head 21 that is extended by a root referred to as the "second" root 22. The second root 22 extends longitudinally from the second head 21 towards an end referred to as the "longitudinal" end 89.

In addition, the second head 21 carries connection means 23 for connecting to a mechanical member, such as a ball joint, for example.

Furthermore, the second root 22 may present a longitudinal orifice 24 suitable for receiving the rod 40, i.e. an orifice extending along the longitudinal axis AX of the damper device.

In the version of FIG. 2, the second root 22 presents a thread 86 around the longitudinal orifice 24. This thread 26 of the second connection member 20 is screwed onto a thread 91 of the projecting portion 43 of the rod 40. For this purpose, the rod 40 may have a turn-preventing orifice 45 suitable for co-operating with a tool to prevent the rod 40 from turning about the longitudinal axis AX.

In the version of FIGS. 3 to 6, the second root is provided with a nut 25 screwed onto the projecting portion 43 of the rod 40.

Furthermore, and with reference to FIG. 2, the damper device includes a closed space into which the rod 40 extends, projecting from the outer casing.

Thus, the projecting portion 43 extends longitudinally from the first side 47 to penetrate into a first closed space 101 arranged between the outer casing 31 and the resilient member 80.

Optionally, and with reference to FIG. 5, the rod 40 includes a projecting portion that projects longitudinally from the second side 48. The projecting portion penetrates into a second closed space 102 that is arranged between the outer casing 31 and the first connection member 10.

The operation of the damper device is explained with reference to FIG. 2.

When the damper device 7 is stressed in traction or in compression, one of the connection members 10, 20 moves away from or towards the other connection member 20, 10. This relative movement of the connection members 10, 20 applies stress simultaneously to the resilient member and to the hydraulic system.

While the damper device 7 is stressed in traction, the piston 50 compresses the second hydraulic chamber 36.

The hydraulic fluid contained in the second hydraulic chamber 36 is throttled on being moved towards the first hydraulic chamber 35 through each calibrated orifice 51. The throttling of the fluid produces damping that generates a first slope in a damping relationship of the damper device.

So long as the pressure in the second hydraulic chamber 36 is less than the pressure exerted by the spring of the traction limiter valve 62, the traction limiter valve 62 remains closed. The hydraulic fluid does not pass through any limiter chamber.

The traction limiter valve 62 opens when the pressure in the second hydraulic chamber 36 is greater than the pressure exerted by the spring of the traction limiter valve 62. The shutter means of this traction limiter valve 62 then move and no longer shut off the associated constriction 68.

The hydraulic fluid contained in the second hydraulic chamber 36 is throttled on being moved towards the first hydraulic chamber 35 through each calibrated orifice 51 and through the traction limiter valve 62.

The throttling of the fluid produces damping that generates a second slope in a damping relationship of the damper device. The stiffness of the spring of the traction limiter valve 62 serves to obtain a second slope that is less steep than the first slope.

If the pressure continues to increase, the movement in translation of the shutter means 64 is blocked by the limiter valve abutment 69. The throttling of the fluid produces damping that generates a third slope in a damping relationship of the damper device.

While the damper device 7 is being subjected to stress in compression, it operates in similar manner by acting on the compression limiter valve 61.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

FIGS. 2 to 6 show various embodiments. Nevertheless, other embodiments can be derived therefrom, in particular by associating the various variants of the compensation chamber, the various alternatives of the resilient means, and the various means for fastening the second connection member.

What is claimed is:

1. A damper device provided with a first connection member and with a second connection member that are suitable for connecting the damper device respectively to a first mechanical member and to a second mechanical member, the damper device including a resilient member and a hydraulic system that are interposed between the first connection member and the second connection member, wherein the hydraulic system includes a sealed outer casing containing a hydraulic fluid, the hydraulic fluid being contained solely in the hydraulic system, the hydraulic system including a rod movable in translation relative to the outer casing, the rod extending longitudinally from a first end to a second end along a longitudinal axis, the rod having a projecting portion that projects longitudinally from the outer casing, the first connection member being fastened in reversible manner to the outer casing in order to be constrained to move in translation with the outer casing, the resilient member being arranged around the projecting portion of the rod, the resilient member including at least one resilient means interposed between a first strength member and a second strength member, the resilient member and the hydraulic system being two distinct modules, the first strength member being fastened in reversible manner to the outer casing in order to be constrained to move in translation with the outer casing, the second strength member being constrained to move in translation with the projecting portion, the second resilient member being fastened in reversible manner to the projecting portion.

2. The damper device according to claim 1, wherein the hydraulic system includes a piston longitudinally defining two hydraulic chambers within an internal space arranged in the outer casing.

3. The damper device according to claim 2, wherein the hydraulic system has a compensation chamber associated with the hydraulic chambers, the compensation chamber being defined by a plug that is movable in translation and that co-operates with a resilient system.

4. The damper device according to claim 3, wherein the compensation chamber and the plug are housed within the rod, each hydraulic chamber being in fluid flow communication with a compensation volume via a passage formed in the rod, the compensation volume being separated from the compensation chamber by the plug.

5. The damper device according to claim 3, wherein the compensation chamber and the plug are housed in a portion of the outer casing arranged in an internal cavity of the first connection member.

6. The damper device according to claim 2, wherein the hydraulic chambers are of identical section, each section representing a cross-section of a hydraulic chamber in a plane perpendicular to the longitudinal axis.

7. The damper device according to claim 2, wherein the hydraulic chambers are in hydraulic communication with two limiter valves, one limiter valve being referred to as the "compression" limiter valve and one limiter valve being referred to as the "traction" limiter valve, the limiter valves throttling the hydraulic fluid passing from one hydraulic chamber to the other hydraulic chamber from a determined amplitude of movement of the piston.

8. The damper device according to claim 2, wherein at least one calibrated orifice is provided through the piston for throttling the hydraulic fluid from one hydraulic chamber to the other hydraulic chamber when the piston moves.

9. The damper device according to claim 1, wherein the second strength member has a projection disposed between a longitudinal abutment of the rod and a longitudinal end of the second connection member.

10. The damper device according to claim 9, wherein a member movable in turning is arranged between the radial projection and the rod in order to allow the rod to turn relative to the resilient member about the longitudinal axis.

11. The damper device according to claim 1, wherein the rod including the projecting portion projects longitudinally from a first side of the outer casing, and the damper device includes a closed first space through which the projecting portion passes and arranged between the outer casing and the resilient member, the first space being hydraulically isolated from the hydraulic system in the absence of leakage from the hydraulic system.

12. The damper device according to claim 1, wherein the damper device includes a monitoring system for evaluating the quantity of hydraulic fluid present in the outer casing, the hydraulic fluid is contained solely in the outer casing, and the resilient member is spaced from the sealed outer casing.

13. The damper device according to claim 1, wherein the first strength member carries fins extending radially.

14. The damper device according to claim 1, wherein the resilient means comprise at least one spring.

15. The damper device according to claim 1, wherein the resilient means comprise at least one ring provided with resilient material selected from the group comprising elastomers.

16. The damper device according to claim 1, wherein the second connection member includes a nut screwed onto the rod.

17. The damper device according to claim 1, wherein the second connection member includes a thread cooperating with a thread of the projecting portion, the rod having a turn-preventing orifice suitable for co-operating with a tool for preventing the rod from turning about the longitudinal axis.

18. An aircraft, wherein the aircraft includes at least one damper device according to claim 1.

19. A damper device provided with a first connection member and with a second connection member that are suitable for connecting the damper device respectively to a first mechanical member and to a second mechanical member, the damper device including a resilient member and a hydraulic system that are interposed between the first connection member and the second connection member, wherein the hydraulic system includes a sealed outer casing containing a hydraulic fluid, the hydraulic fluid being contained solely in the hydraulic system, the hydraulic system including a rod movable in translation relative to the outer casing, the rod extending longitudinally from a first end to a second end along a longitudinal axis, the rod having a projecting portion that projects longitudinally from the outer casing, the first connection member being fastened in reversible manner to the outer casing in order to be constrained to move in translation with the outer casing, the resilient member being arranged around the projecting portion of the rod, the resilient member including at least one resilient means interposed between a first strength member and a second strength member, the resilient member and the hydraulic system being two distinct modules, the first strength member being fastened in reversible manner to the outer casing in order to be constrained to move in translation with the outer casing, the second strength member being constrained to move in translation with the projecting portion, the resilient member being fastened in reversible manner to the projecting portion;
wherein the second strength member has a radial projection that is held longitudinally between a longitudinal abutment of the rod and a longitudinal end of the second connection member.

20. A damper device provided with a first connection member and with a second connection member that are suitable for connecting the damper device respectively to a first mechanical member and to a second mechanical member, the damper device including a resilient member and a hydraulic system that are interposed between the first connection member and the second connection member, wherein the hydraulic system includes a sealed outer casing containing a hydraulic fluid, the hydraulic fluid being contained solely in the hydraulic system, the hydraulic system including a rod movable in translation relative to the outer casing, the rod extending longitudinally from a first end to a second end along a longitudinal axis, the rod having a projecting portion that projects longitudinally from the outer casing, the first connection member being fastened in reversible manner to the outer casing in order to be constrained to move in translation with the outer casing, the resilient member being arranged around the projecting portion of the rod, the resilient member including at least one resilient means interposed between a first strength member and a second strength member, the resilient member and the hydraulic system being two distinct modules, the first strength member being fastened in reversible manner to the outer casing in order to be constrained to move in translation with the outer casing, the second strength member being constrained to move in translation with the projecting portion, the resilient member being fastened in reversible manner to the projecting portion;
wherein the hydraulic system includes a piston longitudinally defining two hydraulic chambers within an internal space arranged in the outer casing;
wherein the hydraulic system has a compensation chamber associated with the hydraulic chambers, the compensation chamber being defined by a plug that is movable in translation and that co-operates with a resilient system; and
wherein the compensation chamber and the plug are housed within the rod, each hydraulic chamber being in fluid flow communication with a compensation volume via a passage formed in the rod, the compensation volume being separated from the compensation chamber by the plug.

* * * * *